United States Patent [19]

Harris et al.

[11] 4,120,413
[45] Oct. 17, 1978

[54] SELF LOAD/UNLOAD TRANSPORTER

[75] Inventors: William G. Harris; Jerome T. Cipkowski, both of Warren, Mich.

[73] Assignee: The United States of America as represented by the Secretary of the Army, Washington, D.C.

[21] Appl. No.: 801,710

[22] Filed: May 31, 1977

[51] Int. Cl.² ............................................. B60P 1/54
[52] U.S. Cl. .................................................. 214/394
[58] Field of Search ................ 214/390, 392, 394, 396

[56] References Cited

U.S. PATENT DOCUMENTS

| 3,224,613 | 12/1965 | Bowman-Shaw | 214/396 |
| 3,348,711 | 10/1967 | Gove | 214/392 |
| 3,572,743 | 3/1971 | Parr | 214/390 |

Primary Examiner—Robert G. Sheridan
Attorney, Agent, or Firm—Peter A. Taucher; John E. McRae; Nathan Edelberg

[57] ABSTRACT

A trailer for transporting containerized freight, said trailer including spaced horizontal rails that can be mechanically spread apart to define a circumscribed space wider than a standard freight container. The trailer can be driven in a reverse direction so that the rails move alongside the freight container. Lift devices on the trailer hoist the container upwardly above the plane of the rails, after which the rails are mechanically shifted toward one another to underlie the container. The container is then lowered onto the rails for transport to another geographical location.

1 Claim, 11 Drawing Figures

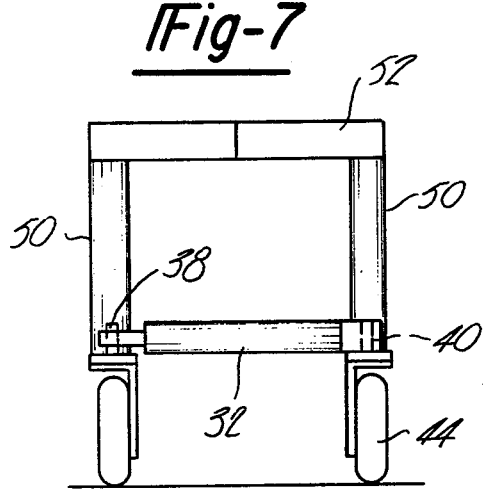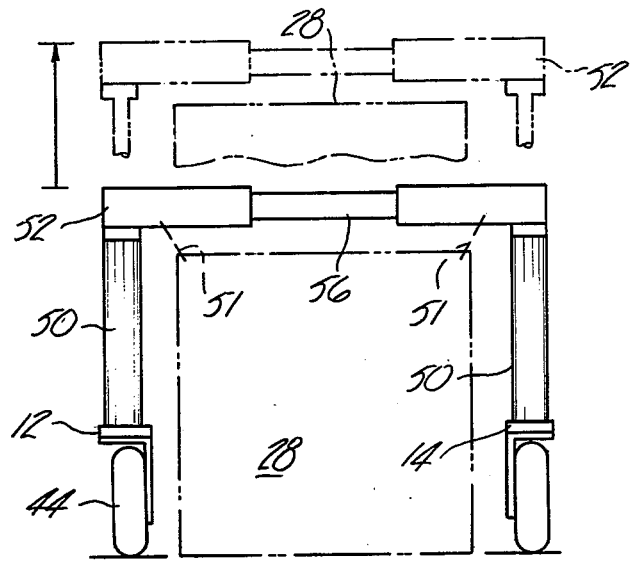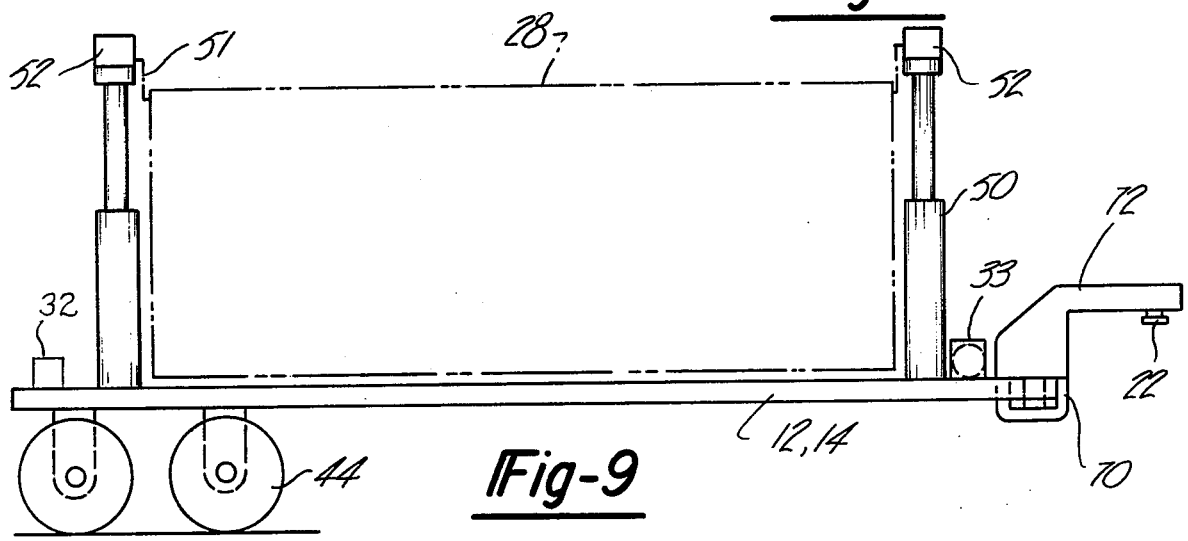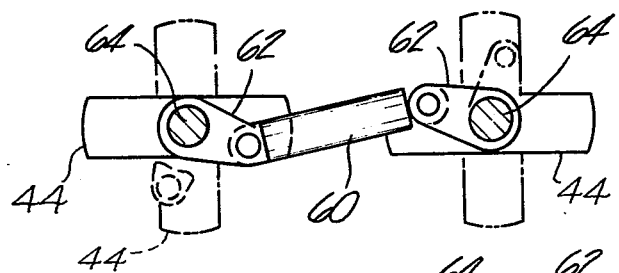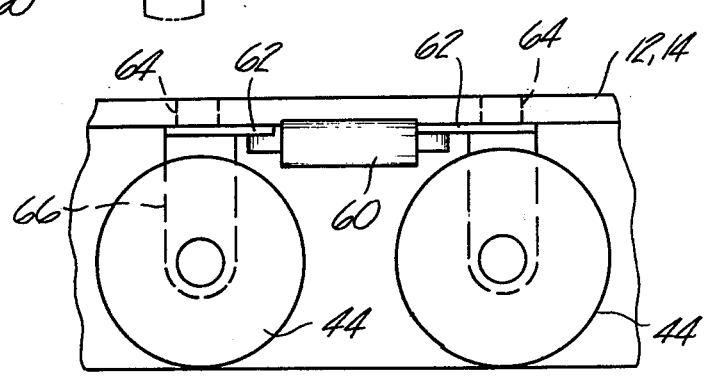

SELF LOAD/UNLOAD TRANSPORTER

The invention described herein may be manufactured used, and licensed by or for the Government for governmental purposes without payment to us of any royalty thereon.

BACKGROUND AND SUMMARY OF THE INVENTION

U.S. Pat. No. 3,815,768 issued in the name of W. M. Goodwin discloses a trailer having side rails that can be mechanically shifted apart to define a circumscribed space wider than a standard freight container or panel-type load. The shift mechanism described in the patent causes the rails to take divergent positions for obtaining adequate clearance relative to the load. The present invention is directed to a trailer that is in some respects similar to the trailer described in U.S. Pat. No. 3,815,768. However the rail-shifting mechanism in our trailer is designed to maintain the rails parallel to one another before and after the shifting operation. This is advantageous in that the trailer can be moved to or from a position straddling a freight container with a minimum amount of back-and-forth maneuvering; the trailer can thereby be steered into relatively close quarters between adjacent containers.

The trailer of this invention is provided with self-contained lift mechanisms that alternately raise and lower a container between ground level and a level above the plane of the rails without tipping or tilting the container. Thus the container is not dragged or skidded along the ground surface so as to possibly damage the container and/or its contents during the lifting or lowering operation.

THE DRAWINGS

FIGS. 7 and 8 are rear elevational views of the FIG. 4 trailer, taken before and after expansion of the trailer side rails.

FIG. 9 is a side elevational view of the FIG. 4 trailer.

FIGS. 10 and 11 are top plan and elevational views of a wheel-adjusting mechanism utilized in the FIG. 4 trailer.

Figure 1:
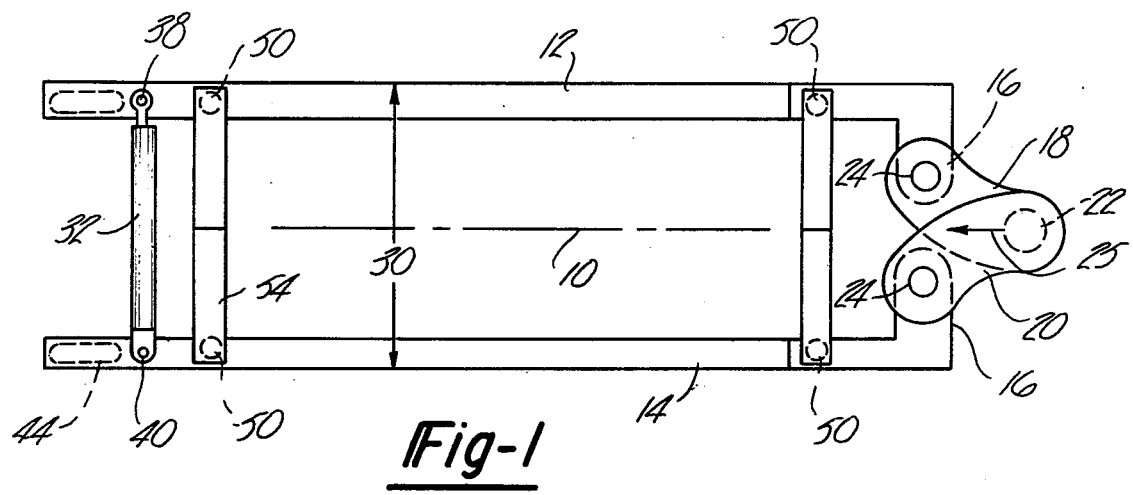
FIGS. 1 and 2 are top plan views of a trailer embodying this invention, taken before and after expansion of the trailer during a container loading or unloading operation.
Figure 2:
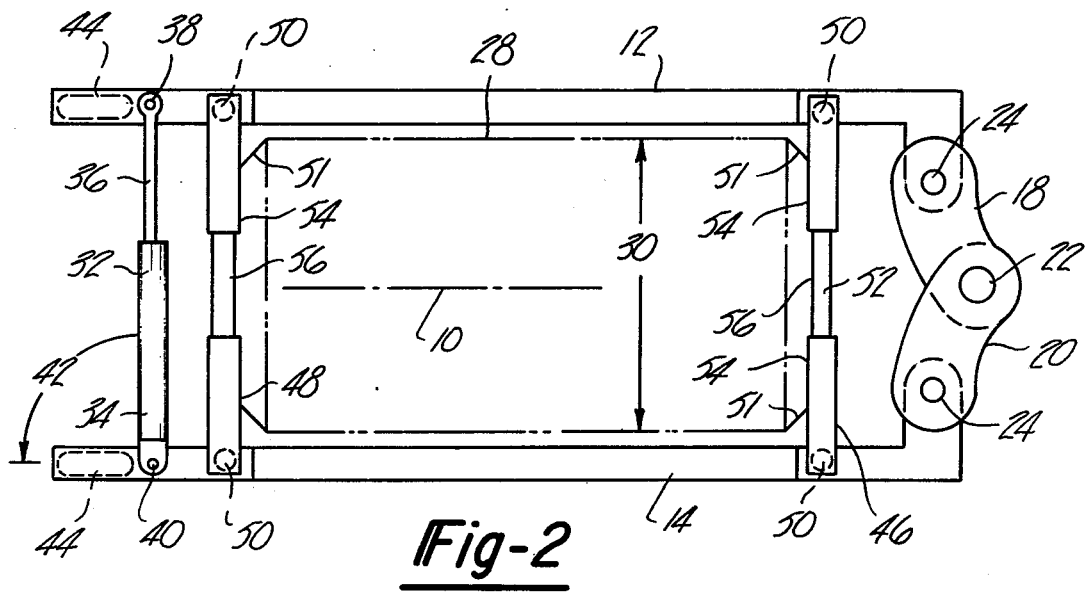
Figure 3:
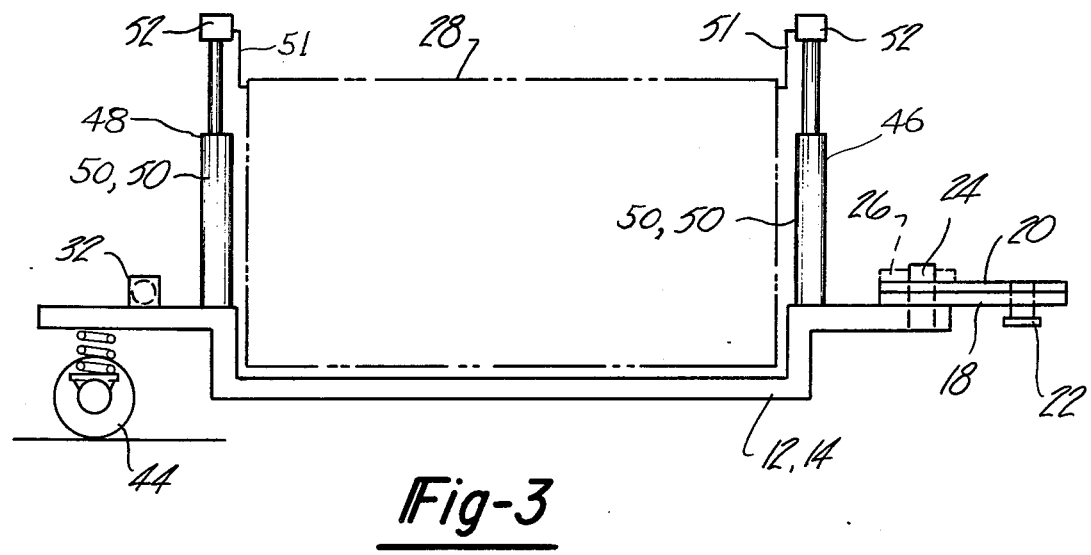
FIG. 3 is a side elevational view of the FIG. 1 trailer.

Referring especially to FIGS. 1 through 3; there is shown a trailer comprising spaced parallel side rails 12 and 14 defining a longitudinal axis 10 for the trailer. The forward ends of the side rails are inturned, as at 16, for pivotal connection with an expansible mechanism defined by overlapping links 18 and 20. The overlapped forward ends of these links are joined together by a kingpin 22 that is adapted to cooperate with a conventional fifth wheel on a non-illustrated tractor.

During overland travel of the tractor-semitrailer combination the links 18 and 20 are intended to act as rigid connections between the rails 12 and 14. Therefore, the pivot connections 24 between the rails and the respective links are extended above the planes of the links to receive a tie bar. The tie bar is not visible in FIGS. 1 and 2, but is shown in dotted lines at 26 in FIG. 3.

It will be seen that rails 12 and 14 are relatively close together in FIG. 1 and relatively far apart in FIG. 2. FIG. 1 illustrates the adjusted positions of the rails during the transport period, whereas FIG. 2 illustrates the positions taken by the rails when the trailer is straddling a standard freight container. The invention may be practiced with varying container sizes; however the most common standard size now in widespread use is 20 feet long, 8 feet wide and 8 feet high. FIG. 2 designates the container by dotted outline reference numeral 28. The container width designated by dimension 30 is approximately the same dimension as the distance between the outboard edges of rails 12 and 14 when the rails are shifted inwardly to the FIG. 1 positions. Therefore, the container can be supported on the upper faces of the rails while the trailer is being transported from one geographical location to another.

The aforementioned links 18 and 20 constitute a mechanism for shifting the forward ends of rails 12 and 14 toward or away from each other. The rearward ends of the rails are shifted toward or away from each other by a second expansible mechanism 32 comprised of a fluid cylinder 34 and piston 36. The defined fluid cylinder means has a detachable pin-like connection 38 with rail 12 and a swingable connection 40 with rail 14. When the connection 38 is disconnected the fluid cylinder means can be swung around the axis of hinge 40 as denoted by arc 42, whereby the fluid cylinder means assumes a non-obstruct position in general parallelism with rail 14. The word non-obstruct is here used to mean a position out of registry with the freight container 28 when the trailer is being moved to or from the straddling position of FIG. 2.

The trailer of FIG. 1 is expanded to the condition of FIG. 2 by driving the tractor in a reverse direction while simultaneously increasing the fluid pressure within the fluid cylinder means 32. As the trailer moves rearwardly the kingpin 22 acts in the direction of arrow 25 to spread the rear ends of the links 18 and 20 apart, thereby shifting the front ends of rails 12 and 14 to the FIG. 2 position; meanwhile the pressurized fluid in cylinder means 32 shifts the rear ends of the rails apart the same distance to maintain the rails parallel with one another. During this shifting action the ground engagement wheels 44 skid laterally on the ground surface. By continuing the rearward motion of the tractor the trailer can be moved alongside a freight container to the straddling position shown in FIG. 2.

To raise and lower the freight container there is provided a first container lift means 46 near the front ends of rails 12 and 14, and a second container lift means 48 near the rear ends of rails 12 and 14. Each lift means is the same in a structural sense. Lift means 46 for example is comprised of two vertically oriented lift cylinders 50 and an overhead beam 52. Beam 52 is an extendible-contractible beam that changes length during the time when the rails 12 and 14 are being adjusted toward or away from one another. As shown in the drawing, the beam comprises two sleeves 54 telescoped over a bar 56; the bar may be affixed to one of the sleeves and slidable within the other sleeve. Each beam is connected to the freight container 28 by two cables 51. The container raising or lowering operation is performed by pressurizing or depressurizing the lower ends of the four fluid cylinders 50. When the trailer is being towed from one geographical location to another the four fluid cylinders 50 are retracted downwardly so that beams 52 are below the roof plane of container 28; this reduces the vertical dimension of the loaded trailer for passage under low bridges or tunnels.

The trailer of FIGS. 4 through 9 is similar to that of FIG. 1 except for the mechanism used to shift the front ends of the container-support rails 12 and 14, and the provision of mechanism to minimize skidding of the wheels during the rail-shift operation.

Figure 4:
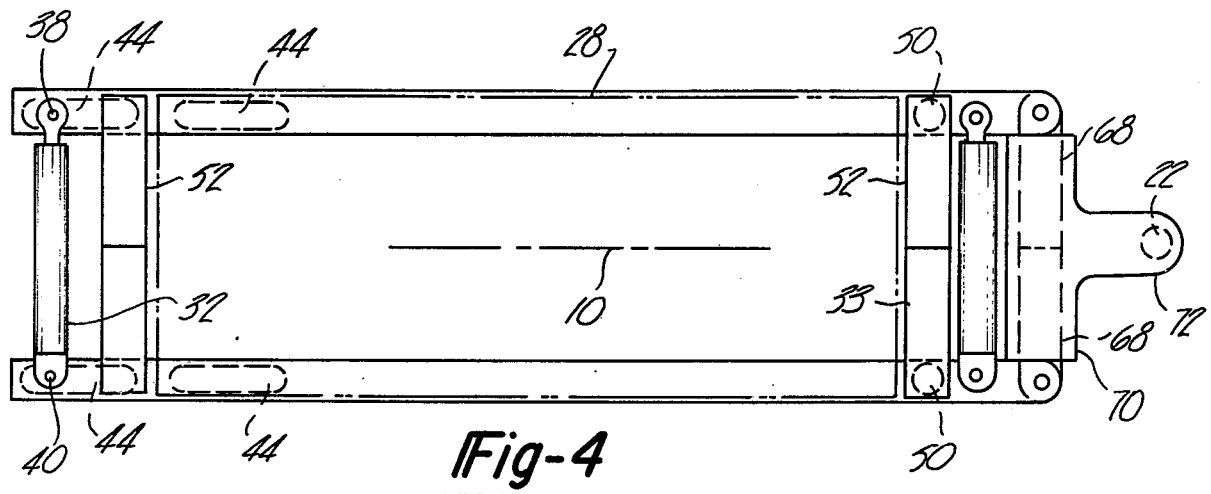
FIGS. 4 and 5 are top plan views of a second trailer embodying this invention, taken before and after a wheel adjustment operation.
Figure 5:
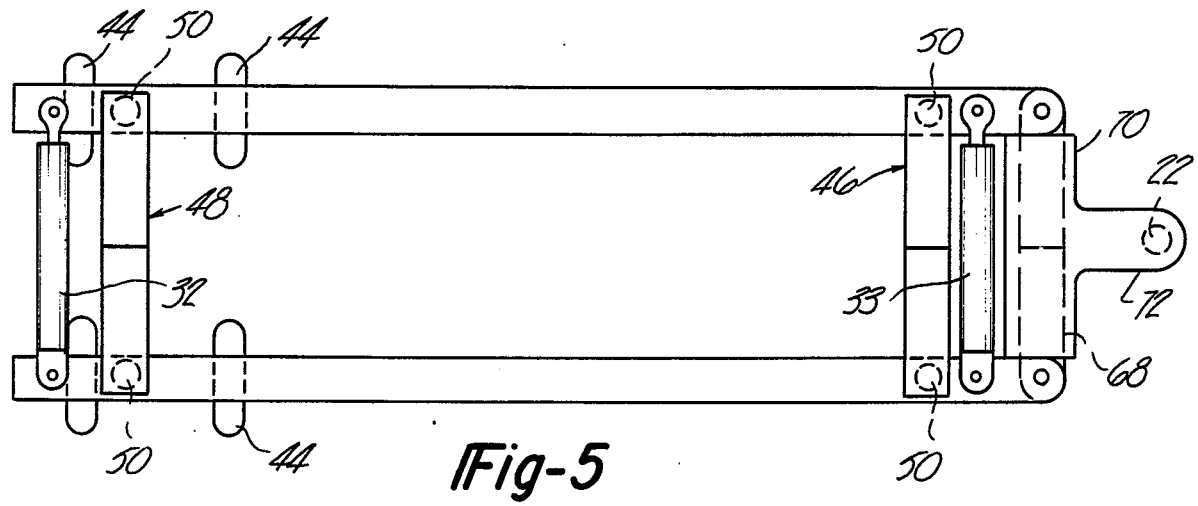

FIG. 4 illustrates the trailer in its transport position wherein side rails 12 and 14 are relatively close together FIG. 5 shows the same trailer with its ground wheels 44 swivelled to positions normal to rails 12 and 14. The mechanism for swivel adjustment of one set of wheels is shown in FIGS. 10 and 11. Such mechanism comprises a fluid cylinder 60 connected at its opposite ends to arms 62 that are affixed to vertically oriented pivot shafts 64 for the wheel yokes 66. Pressurization of the fluid cylinder 60 swings the arms 62 away from each other to thereby adjust the wheels to the dotted positions (FIG. 10).

Figure 6:
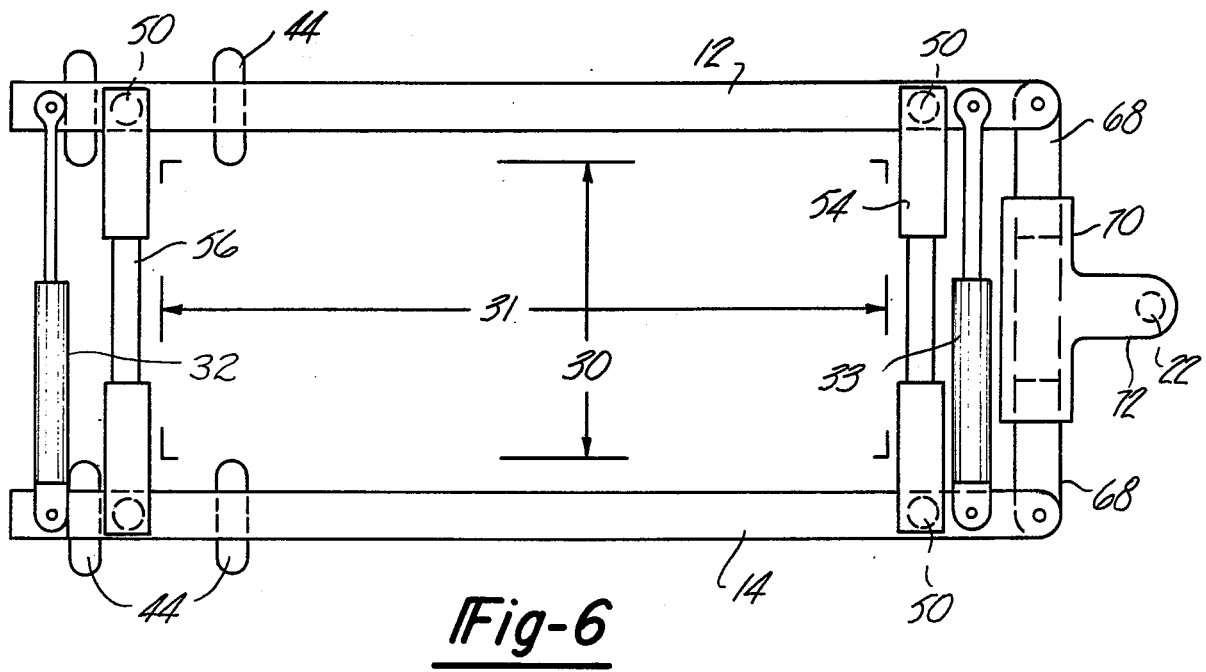
FIG. 6 is a top plan view of the FIG. 4 trailer in an expanded condition.

Referring to FIGS. 5 and 6, the front ends of rails 12 and 14 are pivotally attached to slide elements 68 that extend into a tubular guide 70 forming part of a T-bar. The forward end of the T-bar mounts a kingpin 22. Rails 12 and 14 can be spread apart by the cooperative action of a fluid cylinder means 32 at the rear ends of the rails and another fluid cylinder means 33 near the front ends of the rails. Simultaneous actuation of the fluid cylinders causes the rails to be shifted apart to define a circumscribed space wider than a standard freight container. In FIG. 6 the container width and length dimensions are designated by numerals 30 and 31.

It will be seen that the trailer of FIGS. 4 through 9 is generally similar to the FIG. 1 trailer except for the swivel mechanism of FIGS. 10 and 11 and the extensible mechanism 33. The mechanism of FIG. 10 minimizes the wheel skid problem, but adds some complexity and expense to the assembly. For many situations it is believed that the skid problem would not be significant.

It will be noted that the container lift mechanism in each case operates vertically at one corner of the container without need for booms or cantilever mechanisms. Such cantilever mechanisms, not required with our invention, are detrimental in that they require considerable stiffening or reinforcing of the container lift mechanism, with accompanying weight penalties; they also require larger lift forces and hence greater piston cross sections and/or higher fluid pressures. We also wish to repeat at this point the fact that with a straight up-down motion of the container there is no requirement for skidding the container along the ground surface or tilting the container on end. Such skidding-tilting action could damage the container and/or its contents, as by impacting the contents against the container end wall during a tilt-up operation. This invention is particularly useful by the military for loading and unloading freight containers in isolated regions not equipped with external material handling cranes or dock facilities.

We wish it to be understood that we do not desire to be limited to the exact details of construction shown and described for obvious modifications will occur to a person skilled in the art.

I claim:

1. A trailer for transporting containerized freight, comprising: two spaced parallel horizontal rails defining the trailer longitudinal axis; the outboard edges of said rails being approximately the same distance apart as the width of a standard freight container, whereby the container is enabled to rest on the rail upper faces while the trailer is being transported from one geographical location to another; a kingpin located forwardly of the rails on the trailer axis; a separate swingable link connecting the kingpin to the front end of each rail; said kingpin being capable of attachment to a tractor so that when the tractor is driven in a reverse direction the kingpin will cause the rear ends of the links to swing outwardly, to thereby shift the front ends of the rails away from one another; a fluid cylinder means trained between the rails near their rear ends, said fluid cylinder means being actuable to shift the rear ends of the rails away from one another, whereby the rails then define a circumscribed space wider than a standard freight container; said fluid cylinder means having a swingable connection with one of the rails and a detachable connection with the other rail, whereby said fluid cylinder means can be swung to a non-obstruct position paralleling said one rail when it is desired to drive the trailer to or from a position straddling a ground-contacting freight container; a first container lift means spanning the rails near their front ends, and second container lift means spanning the rails near their rear ends; each container lift means being of inverted U configuration, whereby the trailer can be driven to or from a position straddling a ground-contacting freight container without interference from the lift means; each lift means including an expansible-contractible beam that changes length while the rails are being adjusted toward or away from one another.

* * * * *